US008352724B2

(12) United States Patent
Miyanaga

(10) Patent No.: US 8,352,724 B2
(45) Date of Patent: Jan. 8, 2013

(54) MICROPROCESSOR AND GRID COMPUTING SYSTEM

(75) Inventor: Akiharu Miyanaga, Hadano (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 757 days.

(21) Appl. No.: 10/883,766

(22) Filed: Jul. 6, 2004

(65) Prior Publication Data
US 2005/0050361 A1 Mar. 3, 2005

(30) Foreign Application Priority Data

Jul. 23, 2003 (JP) ................................. 2003-278608

(51) Int. Cl.
*H04L 9/00* (2006.01)
(52) U.S. Cl. ........................................................ 713/150
(58) Field of Classification Search .................. 713/150; 712/36; 709/201–203
See application file for complete search history.

(56) References Cited

U.S. PATENT DOCUMENTS

| | | | |
|---|---|---|---|
| 5,130,977 A | 7/1992 | May et al. | |
| 5,140,583 A | 8/1992 | May et al. | |
| 5,327,127 A | 7/1994 | May et al. | |
| 5,422,879 A | 6/1995 | Parsons et al. | |
| 5,422,881 A | 6/1995 | May et al. | |
| 5,692,193 A * | 11/1997 | Jagannathan et al. | 718/106 |
| 6,031,992 A | 2/2000 | Cmelik et al. | |
| 6,252,273 B1 * | 6/2001 | Salter et al. | 257/316 |
| 6,272,655 B1 * | 8/2001 | Hecht et al. | 714/725 |
| 6,597,956 B1 | 7/2003 | Aziz et al. | |
| 6,714,980 B1 | 3/2004 | Markson et al. | |
| 6,751,734 B1 | 6/2004 | Uchida | |
| 6,779,016 B1 | 8/2004 | Aziz et al. | |
| 6,791,353 B1 * | 9/2004 | Beal et al. | 326/39 |
| 6,891,769 B2 * | 5/2005 | McCollum et al. | 365/222 |
| 6,959,372 B1 * | 10/2005 | Hobson et al. | 711/168 |
| 7,093,005 B2 | 8/2006 | Patterson | |
| 7,103,647 B2 | 9/2006 | Aziz | |
| 7,146,233 B2 | 12/2006 | Aziz et al. | |

(Continued)

FOREIGN PATENT DOCUMENTS

EP 0405989 A 1/1991

(Continued)

OTHER PUBLICATIONS

Thompson, Robert Bruce et al. "PC Hardware in a Nutshell, 3rd Edition" (C)2003 O'Reilly Inc. 17 pages.*

(Continued)

*Primary Examiner* — Kimyen Vu
*Assistant Examiner* — Thomas Gyorfi
(74) *Attorney, Agent, or Firm* — Eric J. Robinson; Robinson Intellectual Property Law Office, P.C.

(57) ABSTRACT

The present invention improves efficiency in utilizing grid computing and promotes spread of the grid computing by solving problems of security technology and distributed computer resource management technology. The present invention improves security technology and distributed computer resource management technology that are problems in improving in efficiency and spread of grid computing. Based on an idea that a mechanism for supporting these control technology is required in a microprocessor level, an auxiliary system for supporting security technology and distributed computer resource management is provided in a software area in a microprocessor comprising a hardware area and the software area, according to the present invention.

5 Claims, 11 Drawing Sheets

U.S. PATENT DOCUMENTS

| | | | |
|---|---|---|---|
| 7,370,013 B1 | 5/2008 | Aziz et al. | |
| 7,401,333 B2* | 7/2008 | Vandeweerd | 718/102 |
| 7,463,648 B1 | 12/2008 | Eppstein et al. | |
| 7,503,045 B1 | 3/2009 | Aziz et al. | |
| 7,555,566 B2* | 6/2009 | Blumrich et al. | 709/249 |
| 2002/0103889 A1 | 8/2002 | Markson et al. | |
| 2003/0126265 A1* | 7/2003 | Aziz et al. | 709/227 |
| 2004/0006584 A1* | 1/2004 | Vandeweerd | 709/107 |
| 2004/0134988 A1 | 7/2004 | Pettinelli et al. | 235/462.25 |
| 2004/0183681 A1* | 9/2004 | Smith | 340/573.1 |
| 2004/0184359 A1* | 9/2004 | Li | 369/1 |
| 2004/0189475 A1* | 9/2004 | Cooper et al. | 340/573.1 |
| 2005/0167672 A1 | 8/2005 | Yamazaki et al. | |
| 2005/0277253 A1 | 12/2005 | Kato et al. | |

FOREIGN PATENT DOCUMENTS

| | | |
|---|---|---|
| EP | 0405990 A | 1/1991 |
| EP | 0611014 A | 8/1994 |
| JP | 03-132130 A | 6/1991 |
| JP | 2003-162341 A | 6/2003 |
| JP | 2004-508616 A | 3/2004 |
| WO | WO-01/14987 A | 3/2001 |
| WO | WO-01/98889 A | 12/2001 |
| WO | WO-01/98906 A | 12/2001 |
| WO | WO-01/98930 | 12/2001 |
| WO | WO-02/03203 | 1/2002 |

OTHER PUBLICATIONS

"Transmeta's low power finds place in supercomputers" Published May 20, 2002 by ZDnet.co.uk http://www.zdnet.co.uk/dmisc/print/0,1000000169,2110513-39001058c,00.htm.*

"Transmeta's low power finds place in supercomputers" Published May 20, 2002 by ZDnet.co.uk http://www.zdnet.co.uk/misc/print/0,1000000169,2110513-39001058c,00.htm.*

Inventory Accuracy Glossary (definition of "middleware") Published Feb. 13, 2003 as verified by the Internet Archive. http://web.archive.org/web/20030213132901/http://accuracybook.com/glossary.htm.*

Pityluk, David. "Transmeta Crusoe: A First Look" Published Feb. 2000, reprinted from SystemLogic.net http://www.slcentral.com/articles/00/2/transmeta/print.php.*

"Crusoe Processor, Model TM5800" Published Jul. 5, 2001 by the Transmeta Corporation. (8 pages) http://www.charmed.com/PDF/TM5800.pdf.*

Mirko Dolle. "Message in a Bottle from Transmeta: Transmeta Crusoe TM5600 in detail" © 2001 Linux Magazine. (pp. 42-45) http://www.linux-magazine.com/w3/issue/12/Transmeta_Crusoe_TM5600.pdf.*

"Advanced Configuration and Power Interface Specification" Revision 2.0b Published Oct. 11, 2002 (502 pages) http://www.acpi.info/DOWNLOADS/ACPIspec-2-0b.pdf.*

"Frequently-Asked Questions (FAQ) About Programmable Logic" © 1997-2001 OptiMagic Inc. (8 pages) http://web.archive.org/web/20021212013132/http://www.optimagic.com/faq.html.*

"Actel Breaks Density Barrier With World's First 1-Million Gate, Single-Chip Flash FPGA; New Family Targets Traditional ASIC Markets; Family Supports Complex Designs With New Architectural Features—Additional High Performance I/Os, Memory and Clock Conditioning Functions" Published Jan. 7, 2002. http://goliath.ecnext.com/premium/0199/0199-1372395.html.*

Tvia Inc. Form 10K filed with the United States Securities and Exchange Commission on Mar. 31, 2002 (82 pages) http://www.getfilings.com/o0000891618-02-003046.html.*

Shilov, Anton. "Apple Unveils New iPhone 4S: Its All About the Speed" Published Oct. 4, 2011 (3 pages) http://www.xbitlabs.com/news/mobile/print/20111004110048_Apple_Unveils_New_iPhone_4S.html.*

Ian Foster, Carl Kesselman, Jeffery M. Nick, Steven Tuecke. "Grid Services for Distributed System Integration" Computer magazine (published by IEEE Computer Society), vol. 35, No. 6, pp. 37-46, Jun. 2002.*

Morgan Kaufmann, "The Grid: Blueprint for a New Computing Infrastructure," Jul. 1998, Internet<URL: http:/www.bh.com//mk/default.asp?isbn=1558604758>, pp. 1-18.

Hidemoto Nakada, "To Java Putting Grid Computing into Practice ! Grid Portable Construction by Globus, Java CoG Kit", Java Press, Dec. 15, 2002, vol. 27 , pp. 22-40, Gihyo.

Transmeta's Crusoe TM5800 with built-in security features,, http://pc.watch.impress.co.jp.docs/2003/0115/trans.htm. Jan. 15, 2003.

* cited by examiner

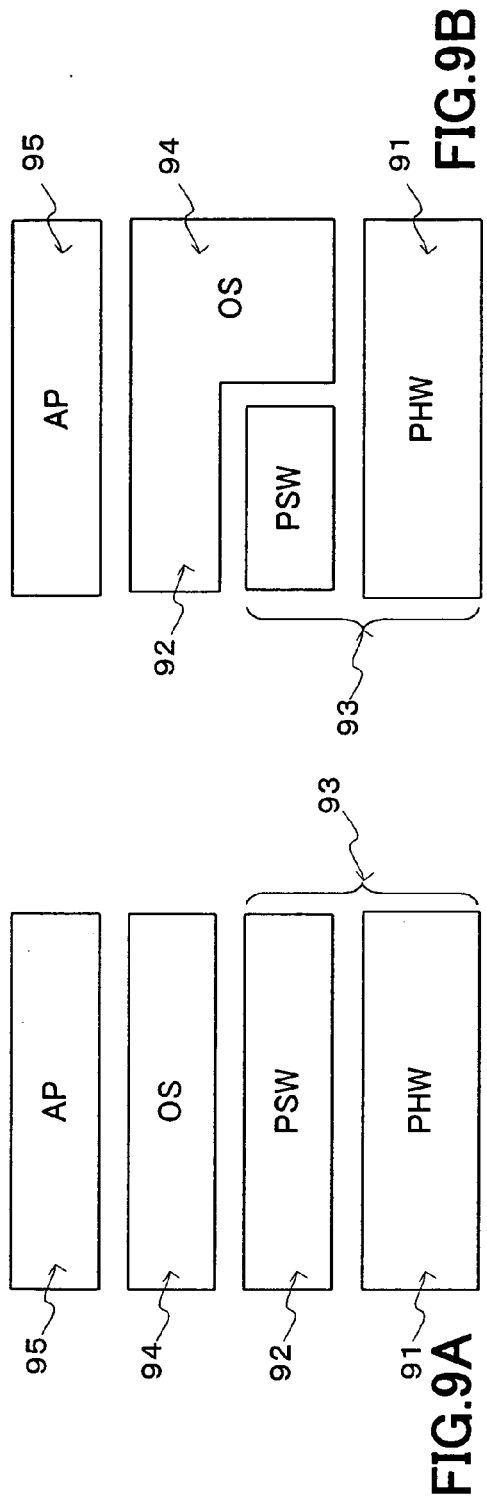
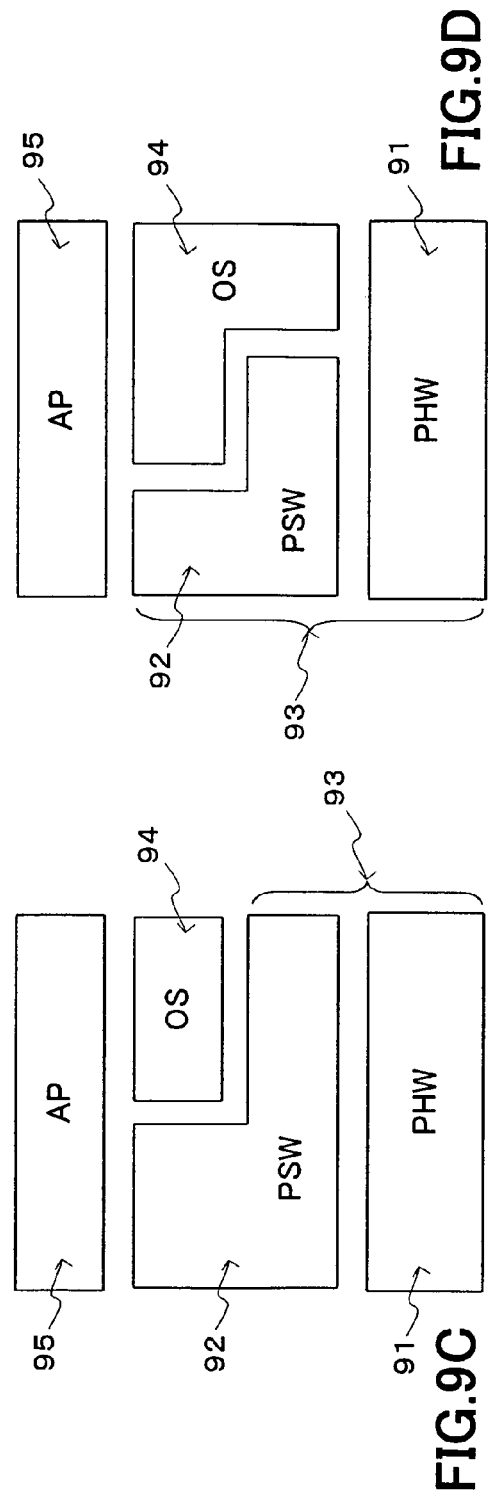
FIG.9A FIG.9B FIG.9C FIG.9D

MICROPROCESSOR AND GRID COMPUTING SYSTEM

BACKGROUND OF THE INVENTION

1. Field of the Invention

The present invention relates to a security technology and a technology for constituting an auxiliary system of a distributed computer resource management technology in a microprocessor level that are important in using grid computing.

2. Description of the Related Art

A grid computing technique is often taken up as a key word of IT (Information Technology). "Grid" is a word that is derived from "power grid" (a high-voltage line transmission network), and comes from an idea of utilizing the computing performance by combining the computers which are distributed geographically without minding a generation location, like electricity. The word "grid" has emerged in 1998 by Ian Foster of Argonne National Laboratory in U.S.A. (Reference 1. Ian Foster, "The Grid: Blueprint for a New Computing Infrastructure", Morgan-Kaufmann, July 1998 Internet <URL:http://www.bh.com//mk/default.asp?isbn= 1558604758>). Note that the content of grid computing is made considering the flow of distributed computing or cluster computing that has been developed so far.

A mechanism for constituting grid computing is now conducted mainly in a middleware level, and Globus ToolKit is a certain de facto standard. Globus ToolKit is developed by the Globus project team where Argonne National Laboratory in U.S.A., universities in U.S.A. such as University of Southern California and companies such as IBM and Microsoft participate in. Globus ToolKit has a primitive function required for grid computing, that is to say, provides only functions of resource management, resource information service and data management that are directly connected to a platform such as an operating system (OS).

Therefore, it is not easy to operate grid computing by only using Globus ToolKit, but more and more middlewares collaborating with Globus ToolKit aiming at grid computing operation appear. There are various methods for utilizing grid computing. Herein, metacomputing, high throughput computing, mega computing, grid portal, data grid, and access grid are introduced briefly as typical methods for utilization, for making a technical background clear.

First, metacomputing is a method for solving a large scale problem that cannot be treated with only one computer, by using plural computers that are connected to one another in a grid environment. A parallel processing among plural computers using MPI (Message Passing Interface) is an implementation method of metacomputing. A large number of middlewares that realize MPI among plural computers each employ an MPI supplied by a vendor in a computer and establish communication between computers by TCP/IP. It is possible to put a parallel program developed in MPI in action in a grid environment without giving a large change, by using these middlewares.

High throughput computing is a method for distributing a large number of processing into computer resources in grid and executing them at high speed. As a specific achievement method, there are a method that a large number of jobs are scheduled and injected into plural resources, and a method that a remote computer that is referred to as RPC (Remote Procedure Call) is asked to perform a process. There is a function to make a job for a local resource in Globus Toolkit, but information of a job must be specified in an API, which is complicated and which is referred to as RSL (Resource Specification Language). In addition, it has a function (DUROC: Dynamically Updated Request Online Co-allocator) to secure plural resources simultaneously, but does not have a scheduling function to perform a load distribution of a job between resources. It is a simple and easy implementation method of high throughput computing that a job manager for a local resource and a scheduler for performing a dynamic load distribution between resources are combined with Globus.

Mega computing is a method by which computers such as personal computers in idling in the world are utilized efficiently, and various data are analyzed, and the number of the computers to be used is assumed to be several million or more literally. As a typical example of use, there is a search project of evidence of intelligent extraterrestrial life "SETI@home (Search for Extra-Terrestrial Intelligence)". A system of this project has been studied by David Anderson in University of California since 1997, an experiment by entry of general personal computers is started in May, 1999, and the project is so big that the number of the personal computers is four million or more.

Grid portal is a method that utilizes a single-sign-on to enable an access to plural sites with one log-in and that can make various resources in a grid or use of service simple and easy.

There is a portal providing an access means to a computing resource itself or a portal providing an access to a function. Portals can improve further convenience by adding functions such as scheduling, a search or comparison of past computed results, a service cooperation of plural sites, rather than a simple service inlet. The technology development about portals is pushed forward also in the world of Web service, and various specifications such as WSIA (Web Services for Interaction Applications), WSRP (Web Services for Remote Portals), and WSXL (Web Services eXperience Language) coexist.

A grid focusing on enormous data as an information resource is referred to as a data grid. In an field such as high energy physics, astrophysics, or bioinformatics, there are more and more needs for sharing of measured data, and the data grid is useful since cooperation of a large number of researchers for analysis is necessary, in the case where the number of observation devices is small but obtained data are enormous, or in the case where data becomes enormous because there is a great deal of measuring objects although the number of devices is large. There is a need to handle data as a distributed file because data size is large and cannot be treated in one place in a science and technology field. In addition, research and development about handling of database in a grid has been performed.

Access grid is a project and software that Argonne National Laboratory in U.S.A. is leading, aims at a human interaction support in a grid, and is a method that can perform a high collaboration by sharing an image of hearing or visual senses with a researcher in a remote location. A sense of reality is more favorable as compared with a conventional video teleconference system and it is greatly different from a commodity personal computer in using software. Accordingly, the number of screens, cameras, or microphones can be increased easily and an access grid node having an arbitrary scale can be built. In addition, high scalability is realized by employing an IP multicast and a broadband backbone, and collaboration at several tens or more of spots is possible.

Grid computing has various diversities and a future with a rapid spread of a network technique as described above. In addition, it has also large expectations for business. However, there are some problems which must be settled in order to promote the spread of grid computing. Especially important problems are the two problems described below.

The first problem is security. In grid computing, security is extremely difficult and thorny. When employed computer resources are very expensive, in many cases, the computer resources belong to different management areas. In addition, there is a case where an executed application includes a confidential matter of a company or a case where it is treated as a valuable asset. Therefore, it is necessary for a user to have "a key" for each of computer resources and data, in addition to a certain mechanism of authentication and authorization. However, when several hundreds or millions of computer resources that are distributed are utilized for solving one complex problem, it is conceivable that a procedure for use is to be single. A standard of existing software security like SSL and X.509 is being improved to satisfy these requests. Further, security infrastructure in grid computing is already included in the existing grid computing environment like Globus.

The second problem relates to resource management technology. A difficult problem in a grid computing environment is a management of distributed computer resources (DRM: distributed resource management), and relates to monitoring states of computer resources and data resources connected by network, scheduling of a job and a resource, an execution method thereof and the like. Specifically, when a large number of sleeping resources are used as typified by mega computing, it is necessary to adequately consider an object that is to reduce the power consumption.

SUMMARY OF THE INVENTION

It is an object of the present invention to improve efficiency in utilizing grid computing and to promote spread of the grid computing by solving the above problems of security technology and distributed computer resource management technology. As for the two problems, most of solutions are solutions made by a control technique in a middleware level on a platform such as OS, and a number of problems are still left.

The present invention improves security technology and distributed computer resource management technology that are problems in improving in the efficiency and spread of grid computing. Based on an idea that a mechanism for supporting these control technology is required in a microprocessor level, an auxiliary system for supporting security technology and distributed computer resource management is provided in a software area in a microprocessor comprising a hardware area and the software area, according to the present invention.

The present invention relates to a microprocessor comprising a hardware area and a software area, and has features described hereinafter, specifically.

An auxiliary system for maintaining security is provided in the software area in a case of establishing grid computing.

An auxiliary system of computer resource management is provided in the software area in a case of establishing grid computing. The auxiliary system of the computer resource management is an auxiliary system for monitoring performance of a computer resource and a state of the computer resource, scheduling of a job and the computer resource, an execution method, and the like.

A power consumption control system is provided in the software area in a case of establishing grid computing.

In the present invention described above, the software area can have a structure in which plural kinds of auxiliary systems or control systems are combined.

The present invention relates to a grid computing system that is established by using a microprocessor including a hardware are and a software area and has features shown hereinafter, specifically.

An auxiliary system for maintaining security is provided in the software area in a case of establishing grid computing, and performance of security can be enhanced by a cooperation of the auxiliary system and grid computing establishment support software that exists in middleware.

An auxiliary system of computer resource management is provided in the software area in a case of establishing grid computing, and performance of grid computing can be enhanced by a cooperation of the auxiliary system and grid computing establishment support software that exists in middleware.

A power consumption control system in the software area is provided in a case of establishing grid computing, and the total power consumption of grid computing is reduced by a cooperation of the power consumption control system and grid computing establishment support software that exists in middleware.

An auxiliary system for maintaining security is provided in the software area in a case of establishing grid computing, and performance of security is enhanced by a cooperation of the auxiliary system and grid computing establishment support software that exists in a center server.

An auxiliary system of computer resource management is provided in the software area in a case of establishing grid computing, and performance of grid computing is enhanced by a cooperation of the auxiliary system and grid computing establishment support software that exists in a center server.

A power consumption control system is provided in the software area in a case of establishing grid computing, and the total power consumption of grid computing is reduced by a cooperation of the power consumption control system and grid computing establishment support software that exists in a center server.

In the present invention, the software area can have a structure in which plural kinds of auxiliary systems or control systems are combined.

The present invention makes it possible to ensure the efficiency and the security of a grid computing system by making a software area have an auxiliary system of security technology or computer resource management technology, in a microprocessor including a hardware are and the software area.

According to the present invention, it is possible to obtain effects such as improving security performance, grid computing performance, reducing power consumption of a whole grid computing by making a software area have an auxiliary system of security technology or computer resource management technology, in a grid computing system using a microprocessor including hardware and software.

These and other objects, features and advantages of the present invention become more apparent upon reading of the following detailed description along with the accompanying drawings.

BRIEF DESCRIPTION OF THE DRAWINGS

In the accompanying drawings:

FIGS. 9A to 9D are each configuration diagrams of microprocessors each including a software area and a hardware area and the periphery thereof;

DETAILED DESCRIPTION OF THE INVENTION

Embodiment mode of the present invention is described with reference to drawings in detail.

At first, a mechanism for constituting grid computing is described in a microprocessor level to make a technical matter clear herein. For example, in the case where one computer is equipped with one multiprocessor, a process of a whole system is carried out with one processor. On the contrary, a system for enhancing processing performance of a whole system by using plural microprocessors simultaneously is referred to as a multiprocessor system. As for the multiprocessor systems, a UMA (Uniform Memory Access) model, a NUMA (Non-Uniform Memory Access) model, and a NORA (No Remote Memory Access) model are given as a parallel computer of a MIMD (Multiple Instruction/Multi Data) type.

Figure 1:
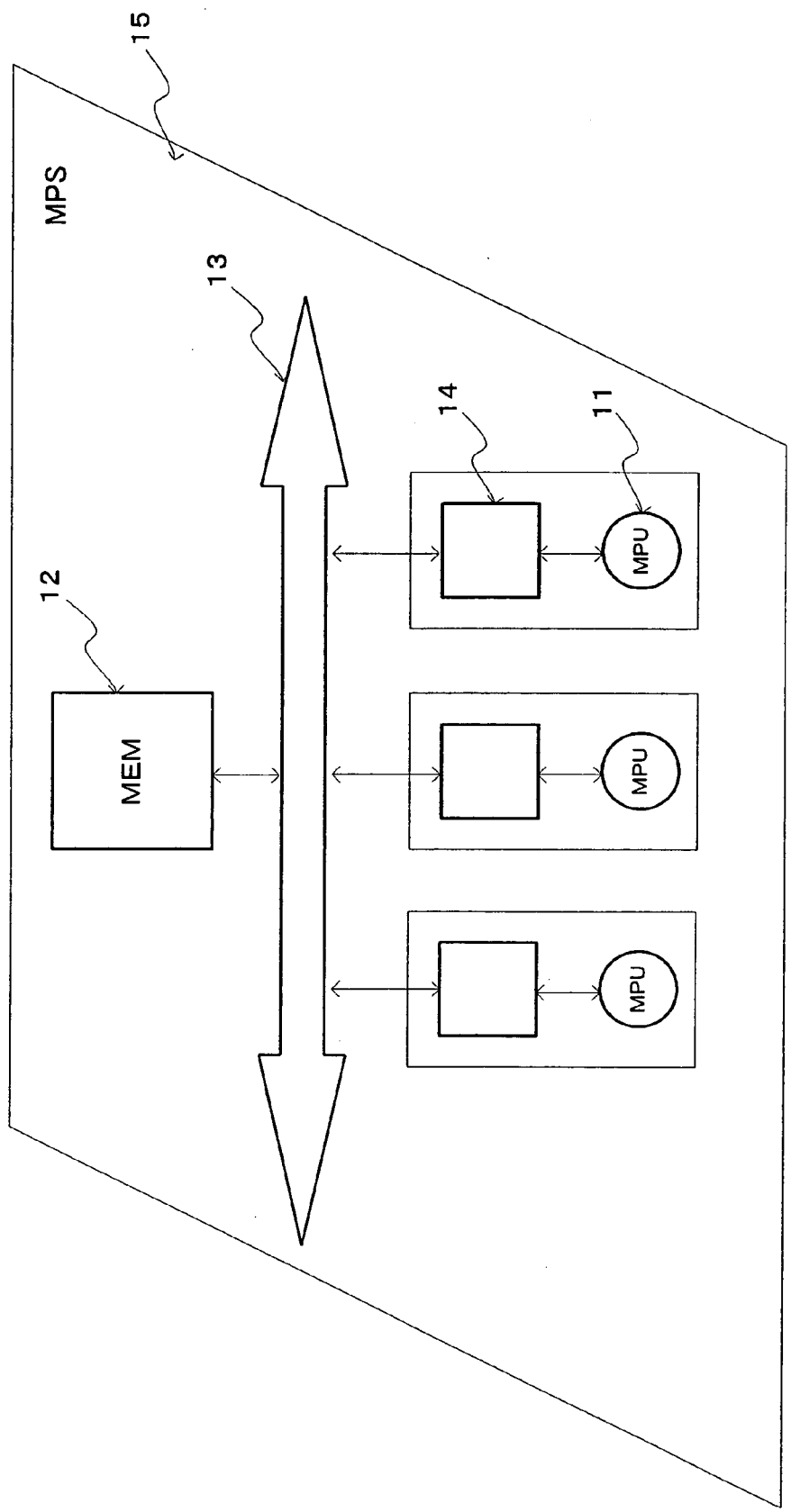
FIG. 1 is a conceptual diagram of a UMA model configuration.
Figure 2:
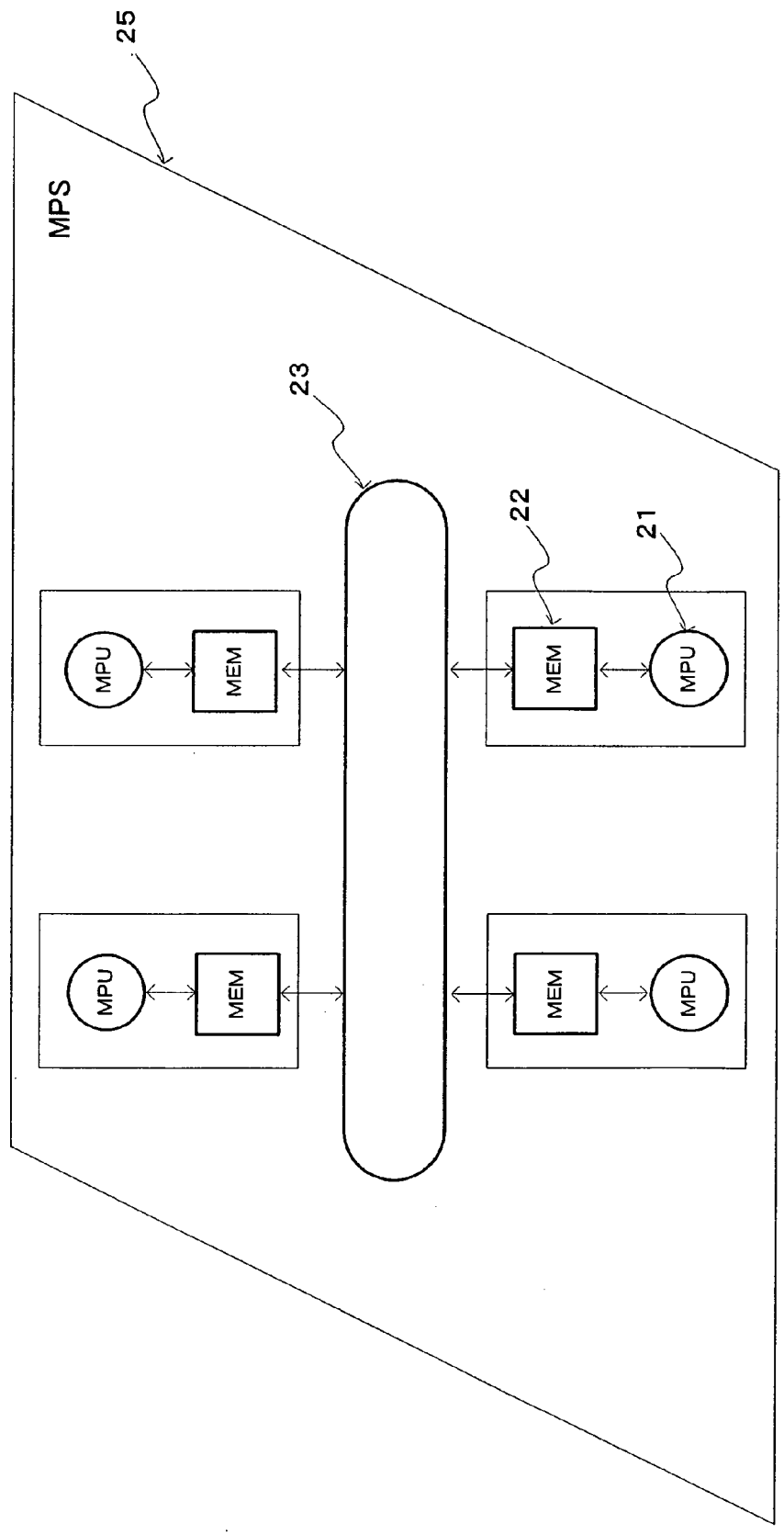
FIG. 2 is a conceptual diagram of a NUMA model configuration.

As for a multiprocessor system 15 of an UMA model, all microprocessors share an address space and it is a model of a common memory which is accessible at a given time or architecture having such a memory. As for this architecture, a uniform access is assumed and a common memory (MEM) 12 is in equidistance from all microprocessors (MPU) 11 as shown in FIG. 1, and must be a system that does not have a difference in processor efficiency. Basically, an access to the common memory is conducted via a common bus 13. In addition, because a common memory space is managed with one OS, the control is relatively easy. However, it lacks in scalability because a uniform access is required. Reference numeral 14 in FIG. 1 denotes a snoop cache. A multiprocessor system 25 of a NUMA model has a memory in which all microprocessors share an address space, but access speed from one microprocessor, is a model different depending on a memory address or architecture having such a memory. This architecture allows a non-uniform access and has a high scalability. As shown in FIG. 2, a common memory does not depend on distance and a performance of microprocessor (MPU) 21 and is arranged as a distributed common memory (MEM) 22. A subsystem is made up of a microprocessor or plural microprocessors and each OS operates independently. Each subsystem has its unique address space corresponding to a common memory, and when a subsystem accesses to a common memory area of another subsystem, it conducts an address translation or the like. Subsystem are coupled by a joint network 23 such as a crossbar switch. A NORA model is a model in which each processor has a memory of an address space independent of each other and which can perform computing by exchanging messages.

Figure 3:
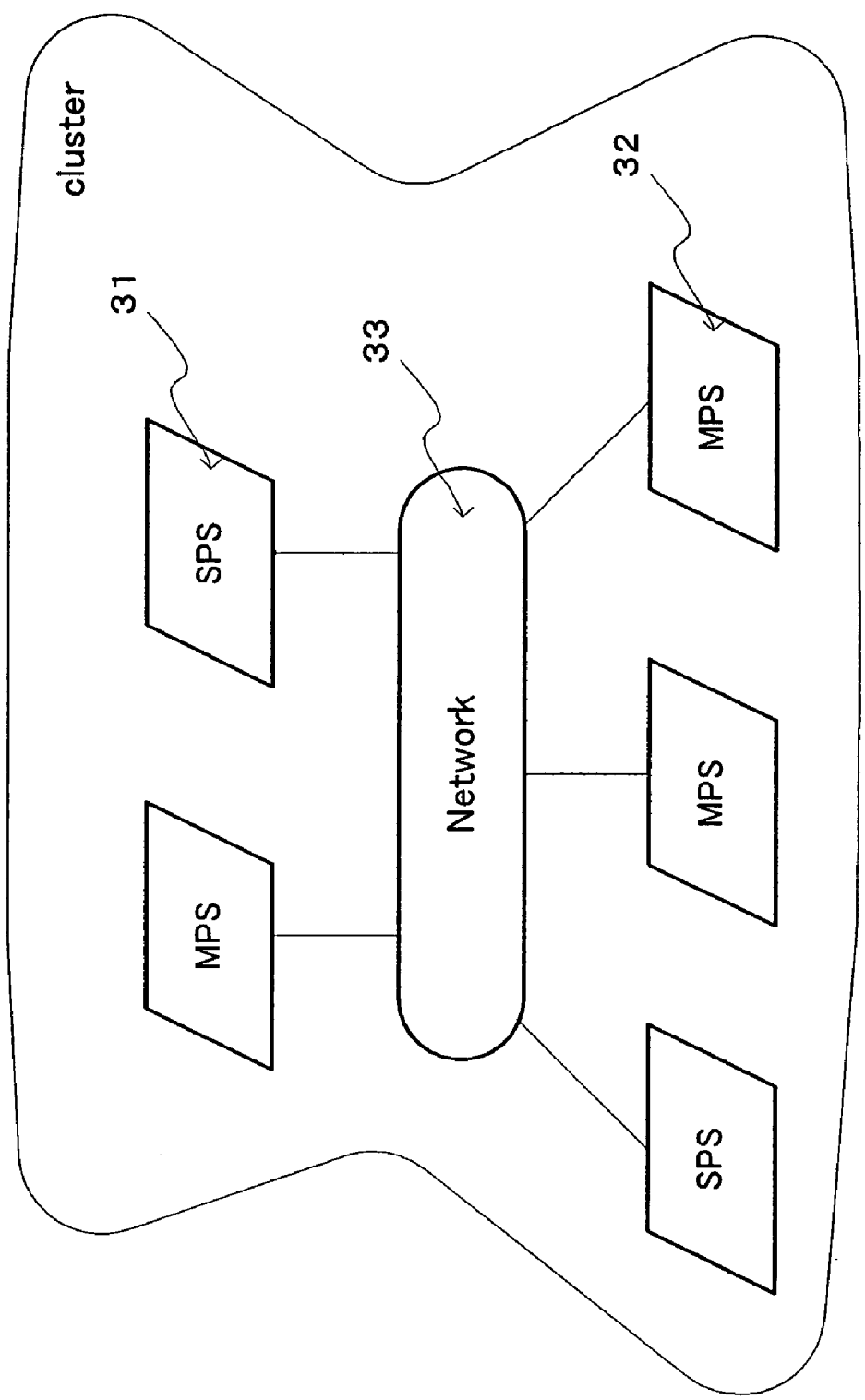
FIG. 3 is a conceptual diagram of a cluster system configuration.
Figure 4:
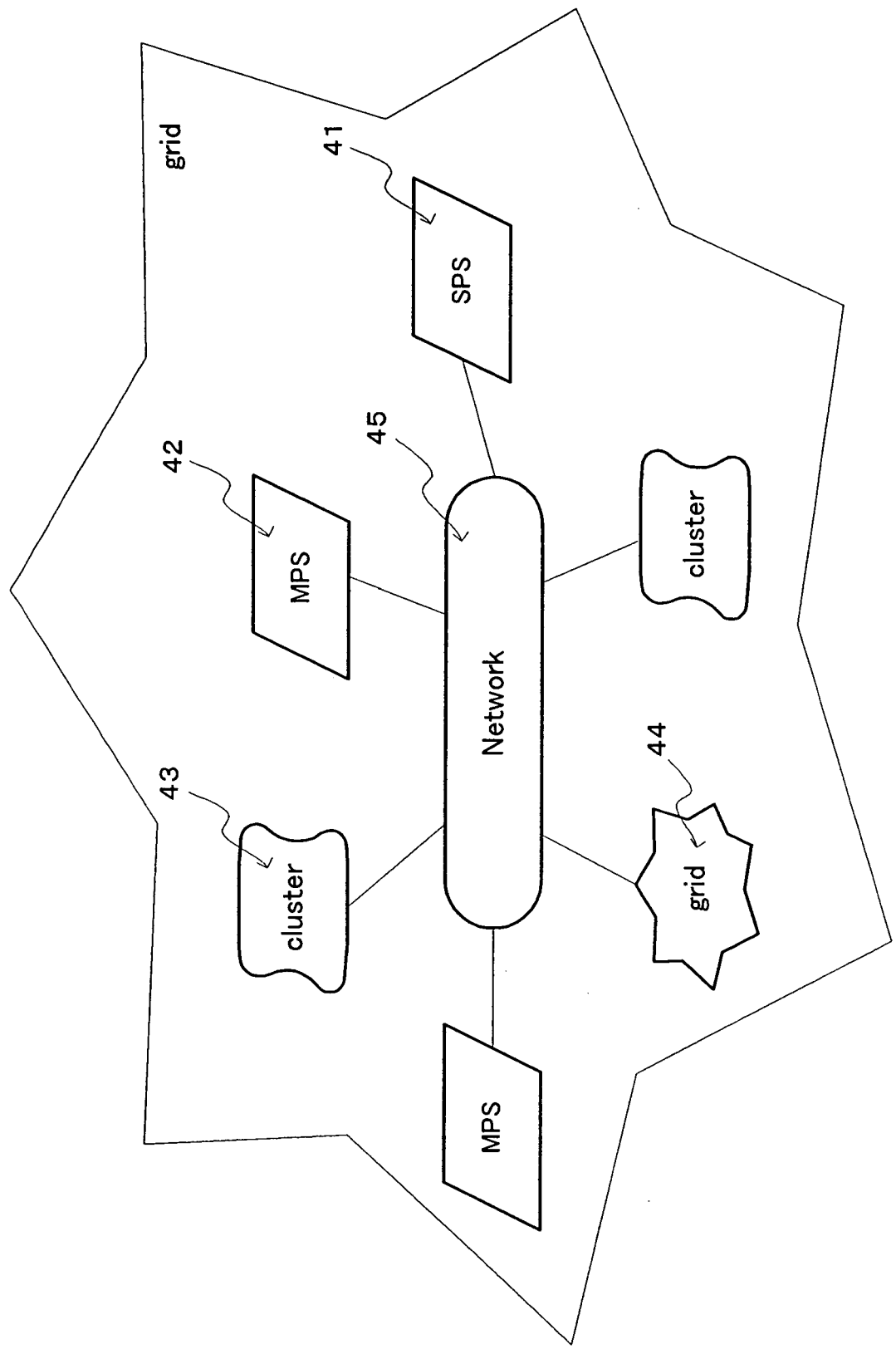
FIG. 4 is a conceptual diagram of grid computing configuration.

A system in which a single processor system (SPS) 31 or a multiprocessor system (MPS) 32 are coupled by a network 33 such as Ethernet is referred to as a cluster system as shown in FIG. 3. The transmission speed between processors that are connected to each other by a network is commonly slower by a single-digit or double-digits than the transmission speed among multiprocessors. In addition, the interprocessor communication is controlled by a middleware such as MPI. Further, as shown in FIG. 4, grid computing can be thought to be distributed computing architecture in which a single processor system (SPS) 41, a multiprocessor system (MPS) 42 and a cluster system (cluster) 43 are organically connected by a network 45. In some cases, a grid system (grid) 44 itself is connected.

Next, a microprocessor having a similar configuration that is available commercially at present is described for the purpose of making a feature of the present invention clear, as for a microprocessor including software that is a component of the present invention, and hardware.

An x86-compatible processor Crusoe that has been released from Transmeta corporation in U.S.A. in January, 2000, includes software and hardware. The hardware area has VLIW type architecture. The x86-compatible processor Crusoe is a microprocessor that is different from CISC (Complex Instruction Set Computer) or RISC (Reduced Instruction Set Computer) architecture.

Conventionally, Out-of-Order type supersealar architecture has been often used for an x86-compatible processor. This Out-of-Order is a function executing an instruction regardless of an instruction execution sequence described in an object code, and needs a function for inspecting that there is no dependency between instructions, and a function which orders an operation result of executed instructions again in a sequence described in the object code. In addition, a superscalar is a function executing two or more instructions simultaneously. Because the average number of instructions to be executed in one cycle increases, in comparison with a microprocessor which executes only one instruction, a high operation function can be shown even at the same operating frequency.

The processor architecture of Crusoe adopts VLIW (Very Long Instruction Word), and an X86-compatibility object code is translated into a VLIW code at an execution time by a run time software program that is called Code Morphing Software and emulation is conducted in the VLIW processor. As a feature accompanying this, there is low power consumption. By employing simple VLIW architecture instead of complex Out-of-Order type superscalar architecture, dynamic power supply voltage optimization referred to as "LongRun Technology" by Transmeta corporation is adopted as well as reducing the number of transistors to be needed to half.

Here, VLIW technology is architecture to describe in parallel a process using plural operational units by a long format instruction such as 128 bits or 256 bits, and a process of four or eight 32-bit instructions by one instruction is possible, for example. This technology is the technology that Josh Fisher has announced for the first time in 1978.

Code translation technology using software or the VLIW technology that is an elemental technology described above is worthy of attention, but individual technology itself is not so new technology. It is important that the notable technical value in Crusoe is a VLIW type microprocessor including a dynamic compiler. This is because technical problems are caused when a simple combination of VLIW technology and code translation technology is conducted. The problem is a time and space overhead of a code translation. For example, the time overhead is a time that is needed to translate an x86 object code into a native VLIW code, and the space overhead is a size that a code translation software itself occupies in a main memory and a memory size that is needed for caching the translated VLIW code in the main memory. Specifically, the problem of time overhead is serious, and only several tens percents of performance of a processor to be executed directly is generally given.

Transmeta Corporation solves the problems about overhead by employing a dynamic binary code translation technique. The dynamic compiler technique supplements optimization by a conventional static compiler technique. The dynamic compiler technique is software to translate into an object code which is optimized for a particular microprocessor by performing instruction scheduling on the object code of a program.

Figure 5A:
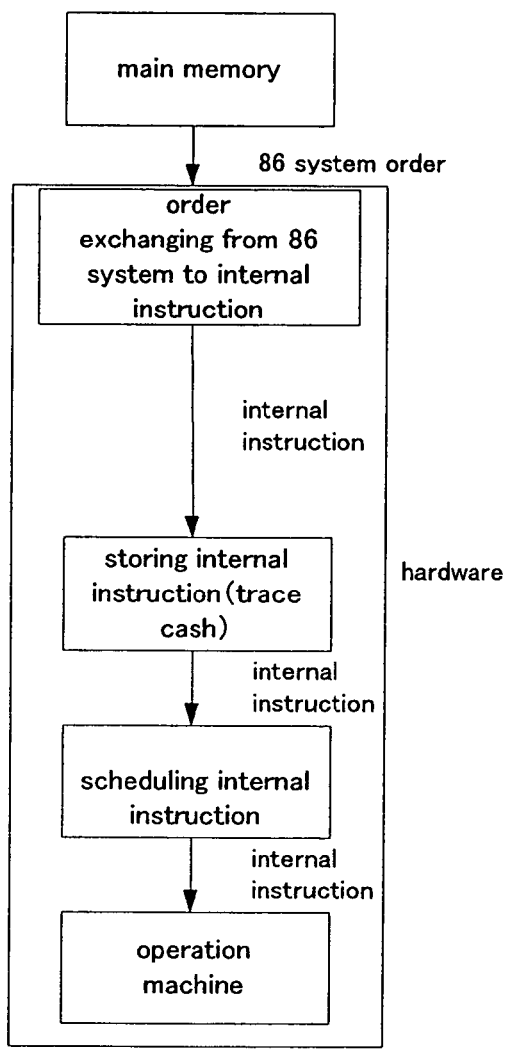
FIGS. 5A and 5B show a comparison of hardware configurations of a superscalar type microprocessor and a VLIW type microprocessor including a dynamic compiler (Ref: Nikkei electronics 2001.2.26)
Figure 5B:
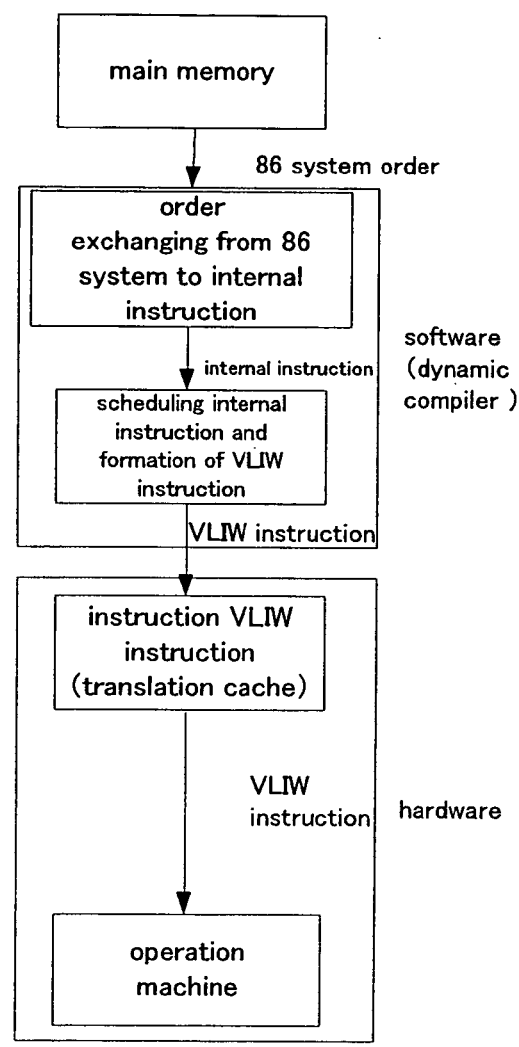

The technique to eliminate a bottleneck of hardware by software is described more concretely with reference to FIGS. 5A and 5B. In a superscalar type microprocessor of FIG. 5A, instruction scheduling is constituted in hardware, which is a bottleneck. On the contrary, because a VLIW processor including a dynamic compiler as shown in FIG. 5B carries out scheduling of an internal instruction in software, a circuit for scheduling the internal instruction is not needed in hardware. Thus, circuits become simple in hardware and it becomes easy to increase the operating frequency for the hardware. By the way, the operation performance of a processor is expressed by the next equation 1.

Operation performance=operating frequency×the average number of instructions to be executed in one cycle [Equation 1]

Figure 6A:
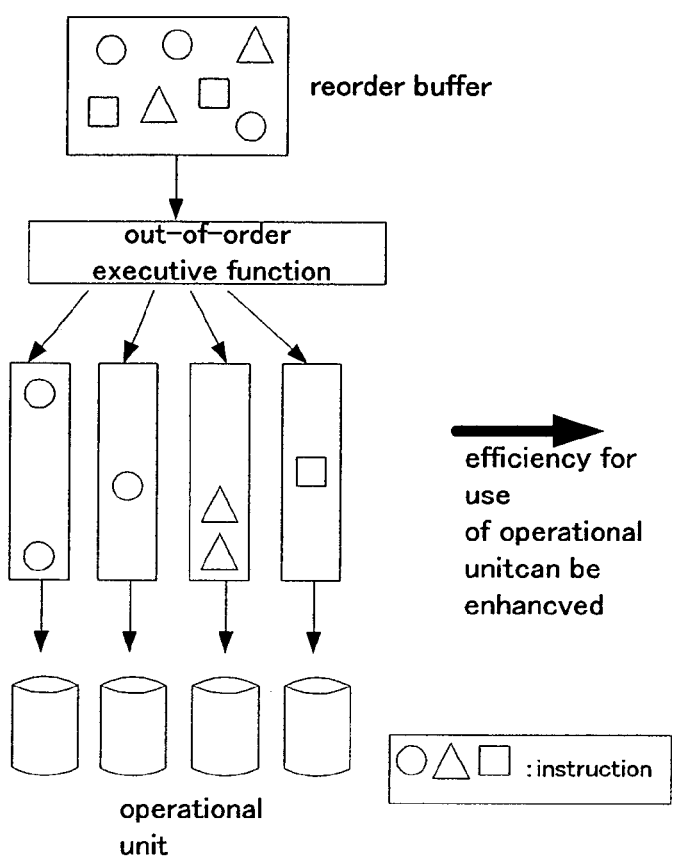
FIGS. 6A and 6B show a comparison of instruction scheduling of a superscalar type microprocessor and a VLIW type microprocessor comprising a dynamic compiler (Ref: Nikkei electronics 2001.2.26)

From a point of view of the average number of instructions to be executed in one cycle, a VLIW processor including a dynamic compiler is superior. The greatest advantage is that the degree of freedom of scheduling is large. This is described with reference to FIGS. 6A and 6B. As shown in FIG. 6A, instructions which are fetched from a main memory are stored once in a buffer that is referred to as a reorder buffer in a microprocessor having a superscalar structure. Instructions which can be executed simultaneously are selected from the stored instructions and sent into an operational unit by an Out-of-order executive function. However, only about several tens to one hundred and several tens instructions can be stored in the reorder buffer, and thus, it is hard to find the instructions which can be executed simultaneously. In other words, the degree of freedom of scheduling is limited by a capacity of the reorder buffer which a microprocessor can integrate, in scheduling by hardware.

Figure 6B:
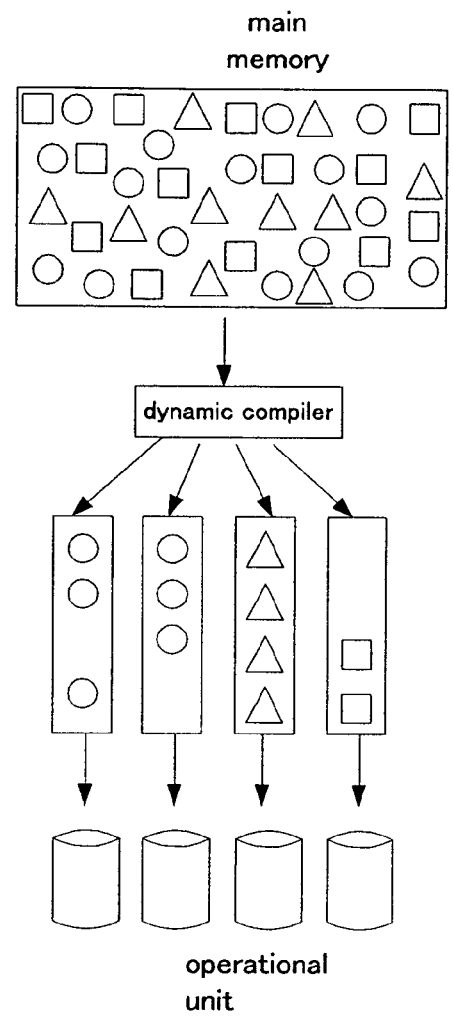

On the contrary, as shown in FIG. 6B, by using a dynamic compiler that can select instructions which can be executed simultaneously from a large number of instructions stored in a main memory, the probability of discovering instructions which can be executed simultaneously becomes high. In other words, when the same object code is executed, the average number of instructions to be executed in one cycle in the VLIW microprocessor including a dynamic compiler can be more increased, as compared with a superscalar type microprocessor. The average number of instructions to be executed in one cycle is expressed by IPC, TCM, and DCO as expressed in the next equation 2, and what is described above means reduction of IPC. IPC, TCM and DCO mean the number of cycles required for execution of one instruction, error rate of a translation cache, and overhead of a dynamic compiler, respectively.

Average number of instructions to be executed in one cycle=1/(IPC+TCM×DCO) [Equation 2]

TCM can be reduced by increase of a cache capacity. Reduction of DCO is advantageous for a dynamic compiler. Depending on program execution circumstances, overhead of a dynamic compiler can be reduced by detecting an instruction path to be executed repeatedly, and by scheduling and optimizing the instruction path intensively. Besides, when an object code that has been optimized once is stored in a cache, it is unnecessary to use the dynamic compiler in the next execution and overhead after that can be dramatically reduced. Crusoe is made considering the points. In Crusoe, some additional functions of hardware are added to increase the efficiency of the dynamic compiler. They are a shadow register function and a store buffer function with a gate. Thus, exception at the time of a speculation process can be carried out precisely. Details thereof are described in U.S. Pat. No. 6,031,992 and the like. In addition, a translated bit or a mechanism of Alias detection is included in Crusoe.

Like Crusoe described herein, an existing microprocessor including software and hardware aims at simplification of design and low power consumption by simplifying the hardware area, and the hardware area is VLIW type architecture.

On the other hand, a microprocessor of the present invention includes software and hardware, but the software area has an auxiliary system of security in grid computing or distributed resource management. In addition, the hardware area is not limited to VLIW type architecture.

Figure 7:
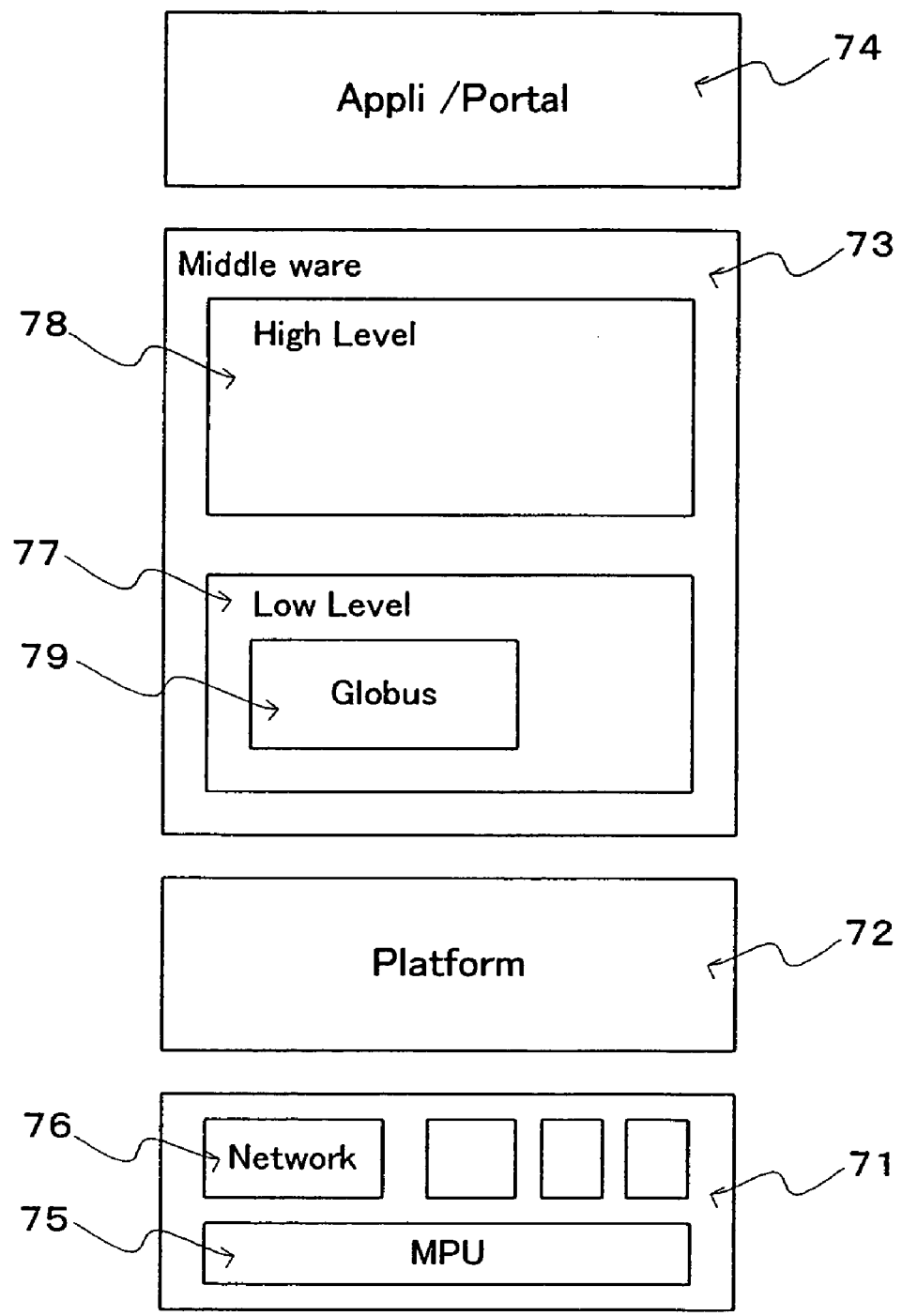
FIG. 7 is a configuration conceptual diagram of inside of a computer that establishes grid computing.

At first, positioning of hierarchy (respective layers) in a computer constituting grid computing is shown in FIG. 7. Above a bottom layer 71 comprising a motherboard or an I/O association such as a microprocessor (MPU) 75 or a network equipment (Network) 76, there is a platform layer (Platform) 72 including OS and the like. For example, operating systems such as Windows, Linux, and Unix are equivalent to this layer. There is a layer that is called middleware 73 above the layer, and it is divided into low level middleware 77 and high level middleware 78 broadly. Software for controlling security or computer resource management in grid computing such as Globus 79 mentioned above exists in the low level middleware. There is also software for establishing a grid computing environment with a cooperation with Globus in the high level middleware layer. Here, Globus is shown as an example of the present de facto standard, but other middleware such as OGSA (Open Grid Services Architecture) may be used. A normal application layer (Appli) 74 exists in a top layer.

Figure 8:
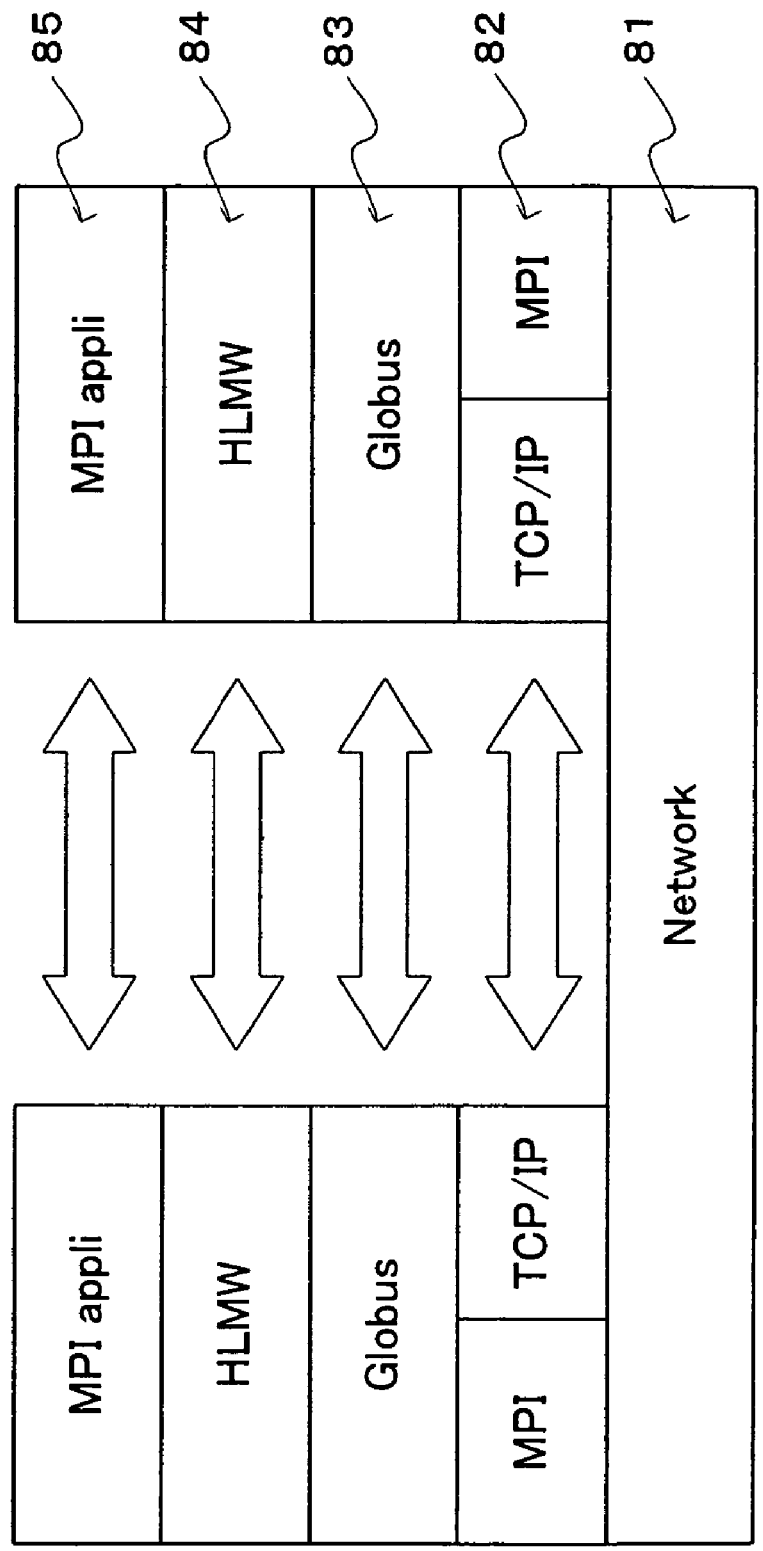
FIG. 8 is a conceptual diagram of communication between computers that establish grid computing.

Next, FIG. 8 is a conceptual diagram showing that communication is carried out among respective layers in communication between computers in the case of constituting grid computing. There is a MPI 82 to perform interprocessor communication in a computer with a TCP/IP that is a base protocol of communication between computers in the upper layer of Network 81 typified by Ethernet. A low level middleware layer (Globus) 83 typified by Globus, a high level middleware (HLMW) 84, a MPI application layer (MPI appli) 85 exist in the order in the upper layer of the MPI 82. Even other grid computing establishment software may be employed without being limited to Globus, as described above.

Next, a configuration of a microprocessor including a hardware area and a software area that is a feature of the present invention and corresponding to the MPU 75 in FIG. 7 is described. A peripheral configuration diagram including a microprocessor of the present invention is shown in FIG. 9.

As shown in FIGS. 9A to 9D, a microprocessor 93 of the present invention is made up of a hardware area (PHW) 91 and a software area (PSW) 92, and an auxiliary system of security technology or distributed computer management technology that is necessary for establishing grid computing is included in the software area, which is a main feature of the present invention. An operating system (OS) 94 is in the upper layer of the software area, and further, a general application (AP) 95 exists in the upper layer thereof. An application here includes middleware and the like. In some cases, the operating system directly accesses to the hardware area like FIG. 9B. Also, it is conceivable that the application directly accesses to the software area of a microprocessor as shown in FIGS. 9C and 9D.

Figure 10A:
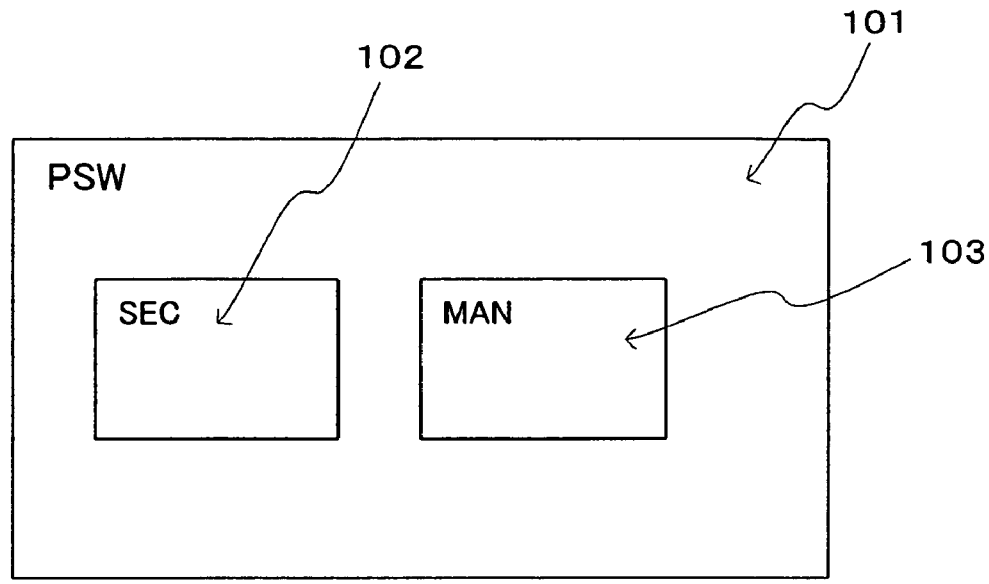
FIGS. 10A and 10B each show a configuration of a software area of a processor.
Figure 10B:
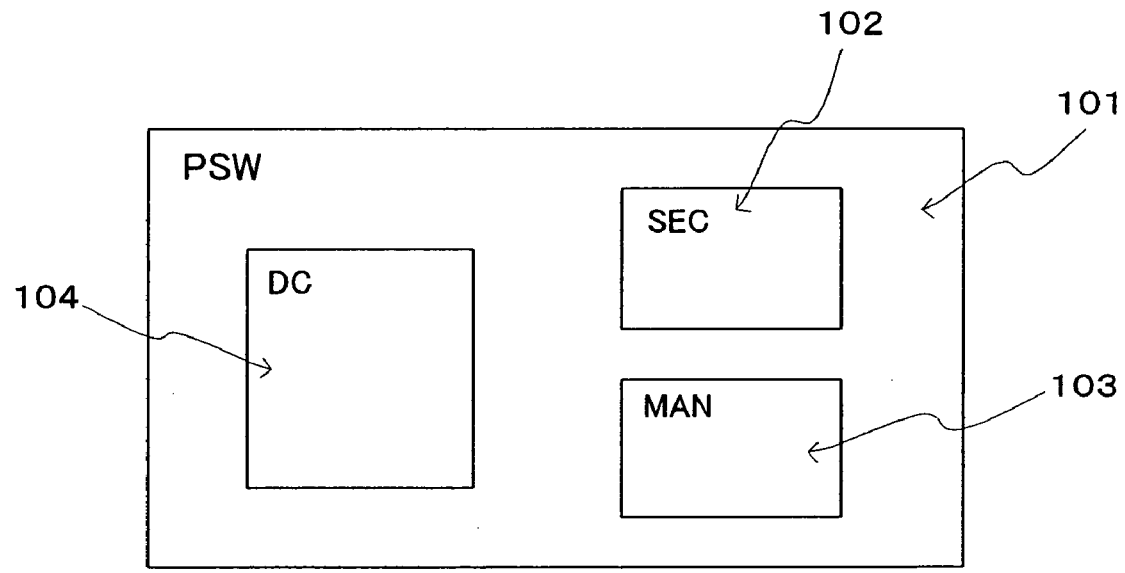

FIGS. 10A and 10B each show a configuration of the software area in FIGS. 9A to 9D. A security auxiliary system (SEC) 102 or a computer resource management auxiliary system is included in a software area (PSW) 101 of a microprocessor. A power consumption control system may be included in the computer resource management auxiliary system, or be independently built in the software area of the microprocessor. Further, a dynamic compiler (DC) 104 can be included in this software area.

As actual procedures, performance of security can be improved by a cooperation of a security auxiliary system and grid computing establishment support software which exists in middleware, performance of grid computing can be improved by a cooperation of a computer resource management auxiliary system and the grid computing establishment support software that exists in the middleware, or the total power consumption of grid computing can be reduced by a cooperation of a system of a power consumption control function and the grid computing establishment support software that exists in the middleware.

Moreover, considering the whole grid system, performance of security can be improved more efficiently by a cooperation of a security auxiliary system and grid computing establishment support software which exists in a center server of a grid system, performance of grid computing can be improved more efficiently by a cooperation a computer resource management auxiliary system and the grid computing establishment support software that exists in the center server of the grid system, or the total power consumption of grid computing can be reduced more efficiently by a cooperation a system of a power consumption control function and the grid computing establishment support software that exists in the center server of the grid system.

A security auxiliary system is, typically, a system certifying a microprocessor or a microprocessor ID, for example. A computer resource management auxiliary system is a performance table of a microprocessor, a cached job scheduling or an instruction path. Power consumption control function includes a system changing a power supply voltage in multistage, a variable system of an interrupt time, an on-off system of an ideal sleeping mode and the like.

[Embodiment]

A microprocessor in which a security auxiliary system or a computer resource management auxiliary system are provided in a software area is suitable for mega computing, since it is also suitable for low power consumption.

An example of a establishment flow of mega computing is described below. Mega computing is established with a computer where dedicated software for grid connection is installed and a center server managing a whole grid.

(1) Dedicated software for grid connection that is distributed or downloaded from Web or the like is installed in a computer.

(2) The dedicated software that is stationed in a computer as a low priority task requests an application and sending of data from a center server.

(3) A program that is to be an instruction of the operation that a grid system should carry out a parallel processing is transmitted to the computer from the center server.

(4) The data is divided in an appropriate size suitable for processing data with the computer by the center server and then, is transmitted to the computer.

(5) The dedicated software of the computer receives an application or delivering of data from the center server, and a process is executed in an idle-time of the computer or a microprocessor.

(6) The dedicated software of the computer transmits a result to the center server as soon as the process finishes. In addition, sending of new data is requested from a center server.

(7) The center server unifies process results of each computer, and makes the unified result a process result as the grid system.

Figure 11:
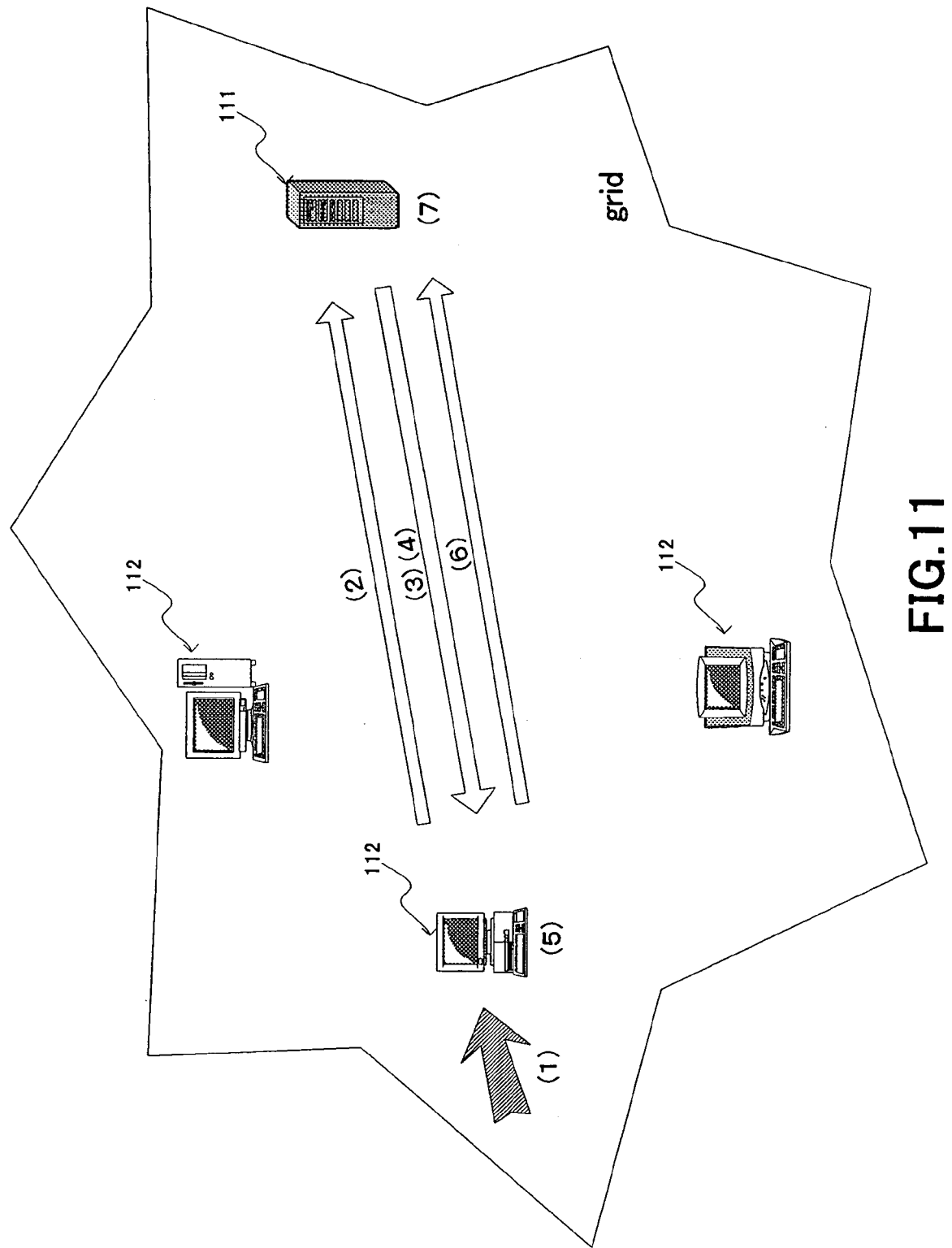
FIG. 11 is a conceptual diagram of a flow in establishing mega computing.

The procedures from (3) to (5) are repeated until all of the data to be processed by the grid system are processed. A conceptual diagram of the above flow is shown in FIG. 11. A grid is established with a center server 111 and a large number of computers 112. The numbers from (1) to (6) in FIG. 11 each correspond to the numbers in the above flow.

When a computer whose process speed is high or an appropriate computer is chosen from a great many computers in sleeping state, or data is split in a size appropriate for processing in individual computers, it is extremely effective to confirm performance in a microprocessor level. In addition, authentication in the microprocessor level is extremely effective in security. When keeping a large number of computers in sleeping state without switching them off, reduction of the power consumption is an important object.

It is a feature of this microprocessor that a way of sleeping of a microprocessor can be changed to some extent in the case where data processing is required repeatedly, or not.

As described above, a microprocessor of the present invention is extremely efficient and a safe system on a grid computing establishment.

This application is based on Japanese Patent Application serial no. 2003-278608 filed in Japan Patent Office on 23 Jul. 2003, the contents of which are hereby incorporated by reference.

Although the present invention has been fully described by way of Embodiment Mode and Embodiment with reference to the accompanying drawings, it is to be understood that various changes and modifications will be apparent to those skilled in the art. Therefore, unless such changes and modifications depart from the scope of the present invention hereinafter defined, they should be constructed as being included therein.

What is claimed is:

1. A system for operating a microprocessor comprising:
a bottom layer comprising the microprocessor, the microprocessor comprising a hardware area and a software area;
a platform layer comprising a memory element storing an operating system; and
an upper layer comprising a memory element storing an application,
wherein an auxiliary system for maintaining security is incorporated in the software area in a case of establishing grid computing, the auxiliary system for maintaining security including a system certifying the microprocessor or a microprocessor ID,
wherein the software area stores code for the auxiliary system for maintaining security while the microprocessor is in an unpowered state,
wherein the operating system is configured to access the hardware area through the software area, and
wherein the software area is configured to access the application.

2. The system for operating a microprocessor according to claim 1,
wherein a dynamic compiler system configured to translate an object code of a program into an object code which is proper to the hardware area is provided in the software area.

3. A system for operating a microprocessor comprising:
a bottom layer comprising the microprocessor, the microprocessor comprising a hardware area and a software area;
a platform layer comprising a memory element storing an operating system; and
an upper layer comprising a memory element storing an application,
wherein an auxiliary system of computer resource management is incorporated in the software area in a case of establishing grid computing, the auxiliary system of computer resource management being a performance table of the microprocessor, a cached job scheduling, or an instruction path,
wherein the software area stores code for the auxiliary system of computer resource management while the microprocessor is in an unpowered state,
wherein the operating system is configured to access the hardware area through the software area, and
wherein the software area is configured to access the application.

4. The system for operating a microprocessor according to claim 3, wherein the auxiliary system of the computer resource management is an auxiliary system for at least one of monitoring performance of a computer resource and a state of the computer resource, scheduling of a job and the computer resource, and an execution method.

5. A system for operating a microprocessor comprising:
a bottom layer comprising the microprocessor, the microprocessor comprising a hardware area and a software area;
a platform layer comprising a memory element storing an operating system; and
an upper layer comprising a memory element storing an application,
wherein a power consumption control system is incorporated in the software area in a case of establishing grid computing, the power consumption control system comprising a system changing a power supply voltage in multistage, a variable system of an interrupt time, or an on-off system of an ideal sleeping mode,
wherein the software area stores code for the power consumption control system while the microprocessor is in an unpowered state,
wherein the operating system is configured to access the hardware area through the software area, and
wherein the software area is configured to access the application.

* * * * *